Patented Jan. 20, 1925.

1,523,802

UNITED STATES PATENT OFFICE.

RAYMOND K. COLE, OF BRUNSWICK, GEORGIA, ASSIGNOR TO HERCULES POWDER COMPANY, OF WILMINGTON, DELAWARE, A CORPORATION OF DELAWARE.

PROCESS OF RESTORING USED DECOLORIZING AND CLARIFYING AGENTS.

No Drawing.   Application filed September 6, 1924. Serial No. 736,320.

*To all whom it may concern:*

Be it known that I, RAYMOND K. COLE, a citizen of the United States, residing at Brunswick, county of Glynn, and State of Georgia, have invented new and useful Improvements in Processes of Restoring Used Decolorizing and Clarifying Agents, of which the following is a full, clear, and exact description.

The object of the invention is to clarify or revivify spent decolorizing and clarifying agents, preferably clays, such as fuller's earth. Such used clays contain coloring matters and other impurities. It is customary to remove such impurities by heating to a high temperature or calcining, but even when so treated, the life of the clay is limited. It is also known to treat such spent clays with a color solvent such as acetone and alcohol containing hydrochloric acid in solution. I have discovered a process of purifying these clays which I believe to be especially efficacious and economical, and which involves the treatment of the clays with a particular solvent of the impurities, namely pine oil, and the removal of the pine oil by a solvent thereof.

As an example of a preferred mode of carrying out the process in restoring used fuller's earth, I proceed as follows: Through a bed of fuller's earth the pine oil is passed under a partial vacuum. The amount of pine oil required to treat a given quantity of fuller's earth will vary with the degree of contamination of the earth and the nature of the impurities contained therein. For example, if one ton of fuller's earth has been used for purifying or decolorizing a rosin solution, I have found about 127 gallons of pine oil to be sufficient to remove practically all the impurities. A smaller quantity of pine oil may suffice, but I prefer to use a somewhat larger quantity than that specified in order to insure complete purification. The preferred temperature of the pine oil when filtration is begun is about 170 degrees C., although a variation of this temperature within a considerable range is permissible.

The pine oil will not drain away to the extent required to leave the earth dry, the earth absorbing and retaining a quantity of the pine oil. If the earth were used, without further treatment, as a decolorizing or purifying agent for a rosin or other solution the absorbed pine oil would increase the solubility of the crude solution filtering through for any impurities that the earth would ordinarily retain and thus the efficiency of the earth for purifying the crude solution would be substantially impaired. To remove the pine solution from the earth, I percolate through the mixture of the earth with pine oil a suitable solvent of pine oil, such as a low boiling point hydrocarbon, preferably gasoline. Other solvents may be used, such as benzol. The gasoline, at a preferable temperature of about 120° C., is allowed to percolate through until all the pine oil is replaced by gasoline and the solution coming through is colorless. The lack of color shows that all traces of impurities have been removed. Assuming that a bed of fuller's earth has been treated as described with pine oil, I have found about 728 gallons of gasoline to be effective. A smaller quantity of gasoline may be sufficient, but the use of a larger quantity may sometimes be advisable.

The earth need be subjected to no further treatment but is ready for reuse.

It has been found that contaminated earth may be subjected to an indefinite number of the purifying treatments described, and after each treatment is restored to its original effectiveness.

It will be understood that the specified quantities of clay, pine oil and pine oil solvent and the temperature specified are not essential to the invention, being merely factors of the treatment which I have found workable and satisfactory in the purification of fuller's earth that has been used for decolorizing certain rosin solutions. The factors specified may vary in case the earth is used for decolorizing other solutions. Nor is the invention limited to the purification of any particular decolorizing or clarifying clay; fuller's earth being specified as an example, being the most commonly used clay for such purpose.

Having now fully described my invention, what I claim and desire to protect by Letters Patent is:

1. The process of purifying used and contaminated clarifying or decolorizing clay which comprises washing the clay with pine oil to take up the impurities in the clay and then removing the pine oil that is retained in the clay by means of a solvent of pine oil.

2. The process of purifying used and contaminated clarifying or decolorizing clays which comprises filtering pine oil through a bed of the clay and then percolating gasoline through the clay until the solution coming through is substantially colorless.

In testimony of which invention, I have hereunto set my hand, at Brunswick, Ga., on this 1st day of September, 1924.

RAYMOND K. COLE.